United States Patent
Leimbach et al.

(10) Patent No.: US 7,562,946 B2
(45) Date of Patent: Jul. 21, 2009

(54) BRAKE REGULATING SYSTEM FOR STABILIZING THE MOTION OF A COMMERCIAL VEHICLE

(75) Inventors: Klaus-Dieter Leimbach, Eschach (DE); Falk Hecker, Markgroeningen (DE); Oliver Jundt, Besigheim (DE); Herbert Schramm, Leonberg (DE)

(73) Assignee: KNORR-BREMSE Systeme für Nutzfahrzeuge GmbH, München (DE)

( * ) Notice: Subject to any disclaimer, the term of this patent is extended or adjusted under 35 U.S.C. 154(b) by 895 days.

(21) Appl. No.: 10/465,962

(22) PCT Filed: Nov. 30, 2001

(86) PCT No.: PCT/DE01/04503

§ 371 (c)(1),
(2), (4) Date: Dec. 16, 2003

(87) PCT Pub. No.: WO02/053424

PCT Pub. Date: Jul. 11, 2002

(65) Prior Publication Data

US 2004/0080209 A1    Apr. 29, 2004

(30) Foreign Application Priority Data

Dec. 29, 2000  (DE) ................. 100 65 724

(51) Int. Cl.
*B60T 8/60* (2006.01)

(52) U.S. Cl. .................. 303/123; 303/146; 701/72

(58) Field of Classification Search .............. 303/123, 303/140, 146, 155; 701/70, 71, 72
See application file for complete search history.

(56) References Cited

U.S. PATENT DOCUMENTS

| 6,223,114 | B1 * | 4/2001 | Boros et al. ................ 701/70 |
| 6,259,973 | B1 * | 7/2001 | Ehret et al. ................. 701/1 |
| 6,278,930 | B1 * | 8/2001 | Yamada et al. ............. 303/146 |
| 6,386,553 | B2 * | 5/2002 | Zetterstrom ............... 280/5.51 |
| 6,604,035 | B1   | 8/2003 | Wetzel et al. |

(Continued)

FOREIGN PATENT DOCUMENTS

DE          39 19 347          2/1990

(Continued)

OTHER PUBLICATIONS

Letter from Japanese associate dated Apr. 14, 2009, with English description of Office Action dated Mar. 18, 2009 received for Japanese patent application JP 2002-554554.

*Primary Examiner*—Thomas J Williams
(74) *Attorney, Agent, or Firm*—Kenyon & Kenyon LLP

(57) ABSTRACT

A brake regulating system particularly suitable for stabilizing the motion of a commercial vehicle is described, in which a control unit outputs, as a function of a number of input variables, a predefined manipulated variable for the brake pressure of each wheel of a commercial vehicle and/or a predefined manipulated variable for an output variable of the drive engine. For detecting the input variables, the input of the control unit is connected to a steering angle sensor for detecting a steering angle predetermined by the driver, to a sensor system for determining the yaw rate of the commercial vehicle, and to a first acceleration sensor for detecting the transverse acceleration of the commercial vehicle.

15 Claims, 4 Drawing Sheets

U.S. PATENT DOCUMENTS 6,668,225 B2 * 12/2003 Oh et al. .................... 303/123

FOREIGN PATENT DOCUMENTS

| | | |
|---|---|---|
| DE | 42 18 034 | 12/1993 |
| DE | 198 29 582 | 3/2000 |
| DE | 198 59 966 | 7/2000 |
| EP | 0 943 514 | 9/1999 |
| EP | 1 046 571 | 10/2000 |
| JP | 2002-533262 | 1/1987 |
| WO | WO 97/39928 | * 10/1997 |

* cited by examiner

BRAKE REGULATING SYSTEM FOR STABILIZING THE MOTION OF A COMMERCIAL VEHICLE

FIELD OF THE INVENTION

The present invention relates to a brake regulating system for stabilizing the motion of a commercial vehicle in which, as a function of a number of input variables for each wheel of the commercial vehicle, a control unit predetermines a manipulated variable for its brake pressure and/or a manipulated variable for an output variable of the drive engine.

BACKGROUND INFORMATION

Within the scope of the vehicle dynamics regulation of a motor vehicle, a dynamic brake regulating system may be used for stabilizing the vehicle motion in which a targeted and selective brake intervention may be executed on each wheel by individually predetermining a brake pressure for each wheel. Such a brake regulating system for a passenger vehicle, as is described in German Patent Application No. 39 19 347, includes a central control unit, which when needed, e.g., when instability of the driving condition begins or is already occurring, determines an individual brake pressure for each wheel from a number of specific input variables for the particular driving situation.

The control unit subsequently transmits a manipulated variable for the brake pressure of the particular wheel to a modulator assigned to that wheel; the modulator in turn acts on the brake system, which is normally a hydraulic brake system, setting the brake pressure, required for stabilizing the driving situation, at the particular wheel. In addition or alternatively to providing the manipulated variables for the brake pressures of the wheels, the control unit may also determine a manipulated variable for reducing an output variable of the vehicle drive, e.g., the engine torque, so that, via targeted reduction of the driving power, a stabilization of the driving situation may be effected or at least supported.

Measured data regarding the wheel speeds, the yaw rate of the vehicle, and the steering wheel angle representing the driver's intention, is supplied as input variables to the control unit of the brake regulating system described in German Patent Application No. 39 19 347. A measured yaw rate of the vehicle corresponding to an actual state is then determined in the control unit from this data and compared to a desired yaw rate, corresponding to a setpoint state determined from the steering wheel angle. When needed, i.e., in the case of a discrepancy between actual state and setpoint state, manipulated variables for individual brake pressures of the wheels are determined from the degree of the discrepancy and passed on to the modulators assigned to the particular wheels.

In contrast to a passenger vehicle, a higher number of degrees of freedom of movement have to be taken into account in the vehicle dynamics regulation of commercial vehicles. Due to the comparatively higher center of gravity, tilting motions or rolling motions of the vehicle body may occur, for example. Therefore, for reliably stabilizing the vehicle motion when used in a commercial vehicle, the brake regulating system described in German Patent Application 39 19 347 is only conditionally suitable.

SUMMARY

An object of the present invention is to provide a brake regulating system of the type mentioned above which is also particularly suitable for use in a commercial vehicle.

According to the present invention, this object is achieved in that the input of the control unit is connected to a steering angle sensor for detecting a steering wheel angle predetermined by the driver, a sensor system for determining the yaw rate of the commercial vehicle, and a first acceleration sensor for detecting the transverse acceleration of the commercial vehicle.

The present invention is based on the consideration that, for use in a commercial vehicle, measured values characterizing the steering angle (and thus the driver's intention) and measured values characterizing the yaw rate of the commercial vehicle should also be supplied to the control unit of the brake regulating system as input variables in addition to the current wheel speed values. Moreover, to allow for the comparatively greater complexity of the handling properties of a commercial vehicle, the float angle, which should generally be kept below the limit value characteristic for the breakaway of the commercial vehicle, should also be taken into account in the brake regulation. The float angle is a variable derivable from the yaw rate of the commercial vehicle and the transverse acceleration of the commercial vehicle acting at its center of gravity. The brake regulating system, designed for a particularly reliable usability in commercial vehicles, is thus also designed for supplying measured values to the control unit which are characteristic for the transverse acceleration of the commercial vehicle.

The sensor system appropriately includes a yaw rate sensor for determining the yaw rate of the commercial vehicle. The yaw rate sensor may be designed as a yaw rate gyro; however, it is preferably designed as a sensor according to the Coriolis principle. The sensor may be situated at any location on the commercial vehicle; however, it is preferably positioned directly at or close to the center of gravity of the commercial vehicle. Based upon the measured values supplied $a_{y1}$ (the transverse acceleration measured by the first acceleration sensor) and $\omega_z$ (the measured yaw rate), the control unit determines the transverse acceleration $a_y$ acting at the center of gravity of the commercial vehicle and necessary for determining the float angle according to the relation:

$$a_y = a_{y1} - \omega^*_z \cdot x_1,$$

where $\omega^*_z$ represents the yaw acceleration derived from measured yaw rate $\omega_z$, and $x_1$ represents the position of the acceleration sensor in relation to the center of gravity of the commercial vehicle, measured in the longitudinal direction of the commercial vehicle. $x_1$ assumes positive values in the forward direction and negative values in the reverse direction.

In an alternative advantageous design, the sensor system for determining the yaw rate of the commercial vehicle includes a second acceleration sensor for detecting the transverse acceleration of the commercial vehicle, the second acceleration sensor, viewed in the longitudinal direction of the commercial vehicle, being situated at an offset to the first acceleration sensor. In this system, which permits omitting the yaw rate sensor and is thus a particularly cost-effective design of the brake regulating system, the control unit determines the yaw rate of the commercial vehicle based upon the measured values supplied to it $a_{y1}$ (the transverse acceleration measured by the first acceleration sensor) and $a_{y2}$ (the transverse acceleration measured by the second acceleration sensor), according to the relation:

$$\omega_z = \int (a_{y1} - a_{y2})/(x_1 - x_2) dt,$$

where $x_1$ and $x_2$ represent the positions of the first and second acceleration sensor in relation to the center of gravity of the commercial vehicle, each measured in the longitudinal direction of the commercial vehicle. $x_1$ and $x_2$ assume positive values in the forward direction and negative values in the reverse direction.

In this arrangement, the control unit of the brake regulating system determines transverse acceleration $a_y$ acting at the center of gravity of the commercial vehicle according to the relation:

$$a_y = (a_{y1} \cdot x_1 - a_{y2} \cdot x_2)/(x_1 - x_2)$$

When equipping an articulated vehicle, formed by the commercial vehicle provided as the semitrailer tractor and a semitrailer connected thereto, with a brake regulating system, it must be pointed out that, compared to the commercial vehicle alone, the semitrailer unit has an additional degree of freedom, namely due to the articulation angle formed by the longitudinal axes of the semitrailer tractor and the semitrailer. With regard to the stability regulation it must also be pointed out that possible jackknifing of the semitrailer in relation to the semitrailer tractor may result in destabilization. In order to integrate this degree of freedom into the stability regulation, in an advantageous refinement, the input of the control unit of the brake regulating system is connected to a articulation angle sensor for detecting the articulation angle between the semitrailer tractor and the semitrailer connected thereto.

In an alternative advantageous refinement, the input of the control unit is connected to a second sensor system for determining the yaw rate of the semitrailer connected to the semitrailer tractor. The second sensor system in particular may also be designed as a yaw rate sensor according to the Coriolis principle. In this arrangement, the control unit determines the articulation angle from the values, supplied as input variables, for the yaw rate of the trailer $\omega_{za}$ and the yaw rate $\omega_z$ of the commercial vehicle according to the relation:

$$\Psi = \int (\omega_z - \omega_{za}) dt$$

This concept is also extendable to truck trains or semitrailer trains, i.e., several trailers coupled behind the commercial vehicle used as the towing vehicle, each trailer being equipped with a sensor system for determining its yaw rate, and, from the yaw rates measured, the control unit determining the articulation angles between each two consecutive vehicles of the truck train.

Due to the raised center of gravity vis-a-vis a passenger car, it may be of particular importance in the stability regulation of a commercial vehicle to take into account the tendency to tilt. This takes place here preferably by taking into account the vehicle tilt which is detected based upon the roll angle formed by a vehicle axis and a reference direction predetermined by the vehicle body. To achieve this, the input of the control unit is advantageously connected to a roll angle sensor for determining the roll angle of the commercial vehicle.

In an alternative advantageous design, the input of the control unit is connected to a roll velocity sensor for detecting the angular velocity between the vehicle body and a vehicle axis. The roll angle is calculatable in the control unit by integration of the measured angle speed over time.

The advantages, achieved through the present invention, are in particular that, by taking into account input variables for the control unit from which the transverse acceleration acting at the center of gravity of the commercial vehicle is derivable, the brake regulating system is particularly reliably applicable, even despite the comparatively complex stability regulation of a commercial vehicle. Due to the above-mentioned applications of additional sensors, which thus enable the supply of additional particularly suitable input parameters to the control unit, the brake regulating system is adaptable to the requirements specific to commercial vehicles in a simple manner.

BRIEF DESCRIPTION OF THE DRAWINGS

An exemplary embodiment of the present invention is explained in greater detail based upon the drawings.

DETAILED DESCRIPTION

The same components are marked with the same reference numbers in all figures.

Figure 1:
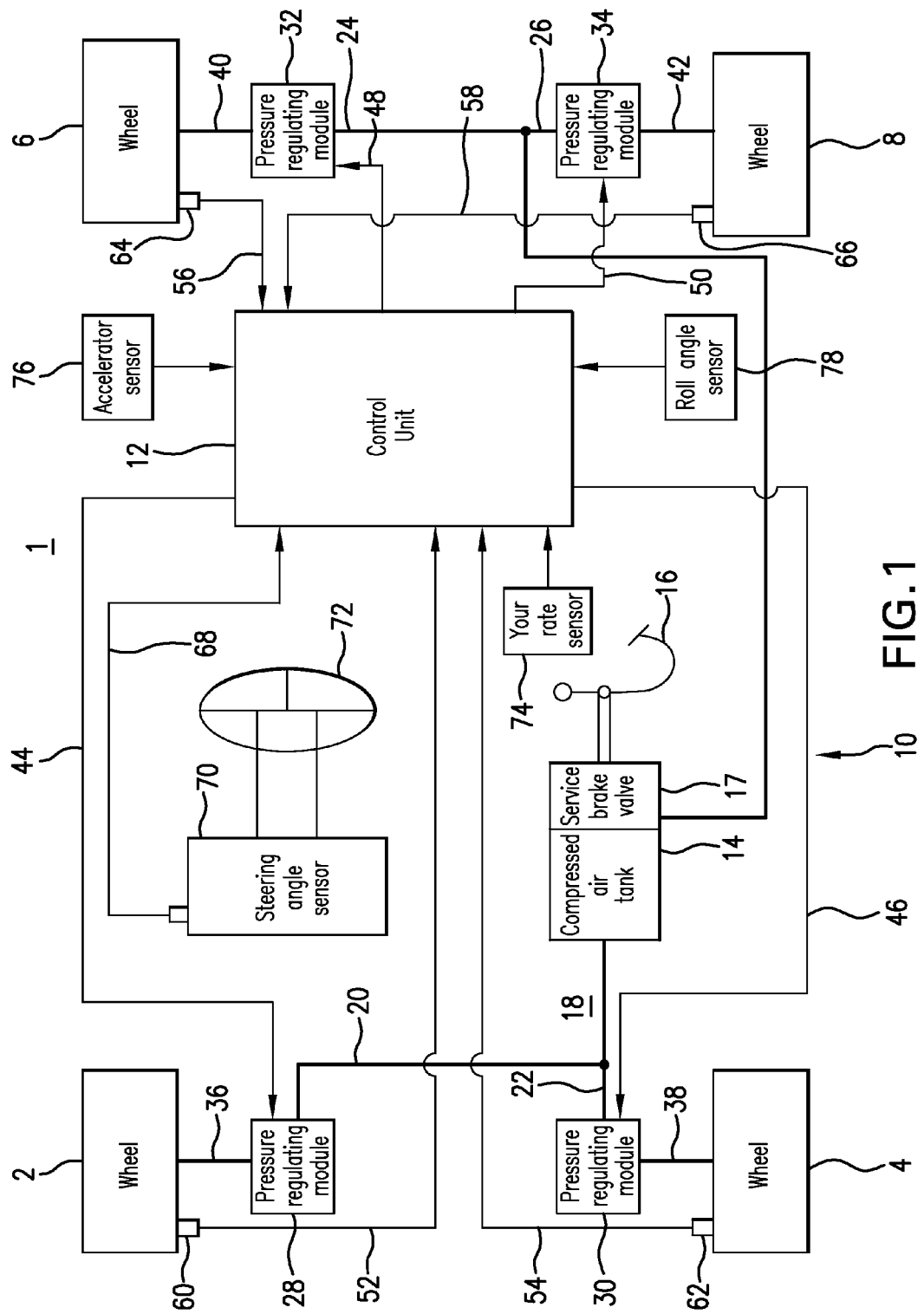
FIG. 1 schematically shows a brake regulating system for stabilizing the motion of a commercial vehicle.

Brake regulating system 1, shown in FIG. 1, is provided for the stability regulation of a commercial vehicle 10 depicted by its wheels 2, 4, 6, 8. Brake regulating system 1 includes a central control unit 12, which when needed, e.g., when instability of the driving condition begins or is already occurring, determines an individual brake pressure for each wheel 2, 4, 6, 8 from a number of specific input variables for the particular driving situation.

Commercial vehicle 10 is equipped with a pneumatic braking system including a compressed air tank 14. A service brake valve 17, operable by the driver of commercial vehicle 10 via a brake pedal 16, is assigned to the compressed air tank. Compressed air tank 14 supplies a pneumatic brake line system 18 with brake pressure as a function of a braking action exercised by the driver via brake pedal 16. Brake line system 18 includes a number of brake lines 20, 22, 24, 26 each of which is assigned to a wheel 2, 4, 6, and 8. Each brake line 20, 22, 24, 26 connects compressed air tank 14 to a pressure regulating module 28, 30, 32, and 34, each being situated upstream from wheels 2, 4, 6, 8, and each setting a brake pressure at the assigned wheel 2, 4, 6, and 8 as a function of the pedal position of brake pedal 16. In a case of emergency, i.e., of the failure of the control electronics, each brake line 20, 22, 24, 26 connects compressed air tank 14 to the particular pressure regulating module 28, 30, 32, and 34, even with an opened service brake valve 17, in such a way that braking of all wheels 2, 4, 6, 8 may take place. Moreover, brake regulating modules 28, 30, 32, 34 are also directly pneumatically connected to compressed air tank 14, i.e., bypassing service brake valve 17, thereby setting the brake pressure at each wheel 2, 4, 6, 8, required for a stabilization of the driving situation, even without a braking action by the driver. For this purpose, as a function of manipulated variables supplied, the modules convert the brake pressure predetermined by compressed air tank 14 into brake pressures individually predetermined for each wheel 2, 4, 6, 8 which are supplied to downstream lines 36, 38, 40, 42 which are connected to the brake system of the particular wheel 2, 4, 6, and 8.

The manipulated variable for the brake pressure of the particular wheel 2, 4, 6, 8 is predetermined by control unit 12. For this purpose, the output of the control unit 12 is connected to pressure regulating modules 28, 30, 32, 34, assigned to wheels 2, 4, 6, 8, via signal lines 44, 46, 48, 50. In addition or alternatively to providing the manipulated variables for the brake pressures of wheels 2, 4, 6, 8, control unit 12 may also determine a manipulated variable for reducing an output variable of the vehicle drive, e.g., the engine torque, so that, via targeted reduction of the driving power, a stabilization of the driving situation may be effected or at least supported.

The input of control unit 12 is connected to speed sensors 60, 62, 64, 66, assigned to wheels 2, 4, 6, 8, via signal lines 52, 54, 56, 58. The speed sensors determine measured values for the instantaneous speed of each wheel 2, 4, 6, 8 which are subsequently supplied to control unit 12 as input variables via signal lines 52, 54, 56, 58. In addition, the input of control unit 12 is connected to a steering angle sensor 70 via signal line 68 for detecting a steering angle. Steering angle sensor 70 determines a measured value characterizing the angle of steering wheel 72 predetermined by the driver and thus the driver's intention, which is suppliable to the control unit via signal line 68 as another input variable.

In addition, the input of control unit 12 is connected to a sensor system including a yaw rate sensor 74, designed according to the Coriolis principle, for determining the yaw rate of commercial vehicle 10, to a first acceleration sensor 76 for detecting the transverse acceleration of commercial vehicle 10, and to a roll angle sensor 78 for detecting the roll angle of commercial vehicle 10. In other words: the yaw rate, the transverse acceleration, and the roll angle of commercial vehicle 10 are suppliable to control unit 12 as additional input variables. These input variables together with the input variables generally used such as the wheel speeds, for example, are taken into account for determining the manipulated variables for the brake pressures at wheels 2, 4, 6, 8, so that brake regulating system 1 operates particularly reliably when used in commercial vehicle 10, despite the greater complexity of the motions.

In forming the manipulated variables for the brake pressures, control unit 12 takes into account in particular transverse acceleration $a_y$ acting in the center of gravity of commercial vehicle 10. This is determined by control unit 12 from measured values supplied to it $a_{y1}$ (the transverse acceleration measured by acceleration sensor 76) and $\omega_z$ (the yaw rate measured by yaw rate sensor 74) according to the relation:

$$a_y = a_{y1} - \omega^*_z \cdot x_1,$$

where $\omega^*_z$ represents the yaw acceleration derived from measured yaw rate $\omega_z$ and $x_1$ represents the distance between acceleration sensor 76 and the center of gravity of the commercial vehicle, measured in the longitudinal direction of the commercial vehicle.

The transverse acceleration at the center of gravity of commercial vehicle 10 determined in this way is used together with the yaw rate for determining the float angle. Control unit 12 ensures here that a predetermined limit value for the float angle is not exceeded, thus preventing a breakaway of commercial vehicle 10.

Likewise, the roll angle detected by roll angle sensor 78 is monitored, so that an impending tilt of commercial vehicle 10 is detected early enough to introduce countermeasures. Instead of roll angle sensor 78, a roll velocity sensor for detecting the angular velocity between the vehicle body and a vehicle axis may also be provided alternatively. The roll angle may be calculated in control unit 12 by integration of the angular velocity measured over time.

Figure 2:
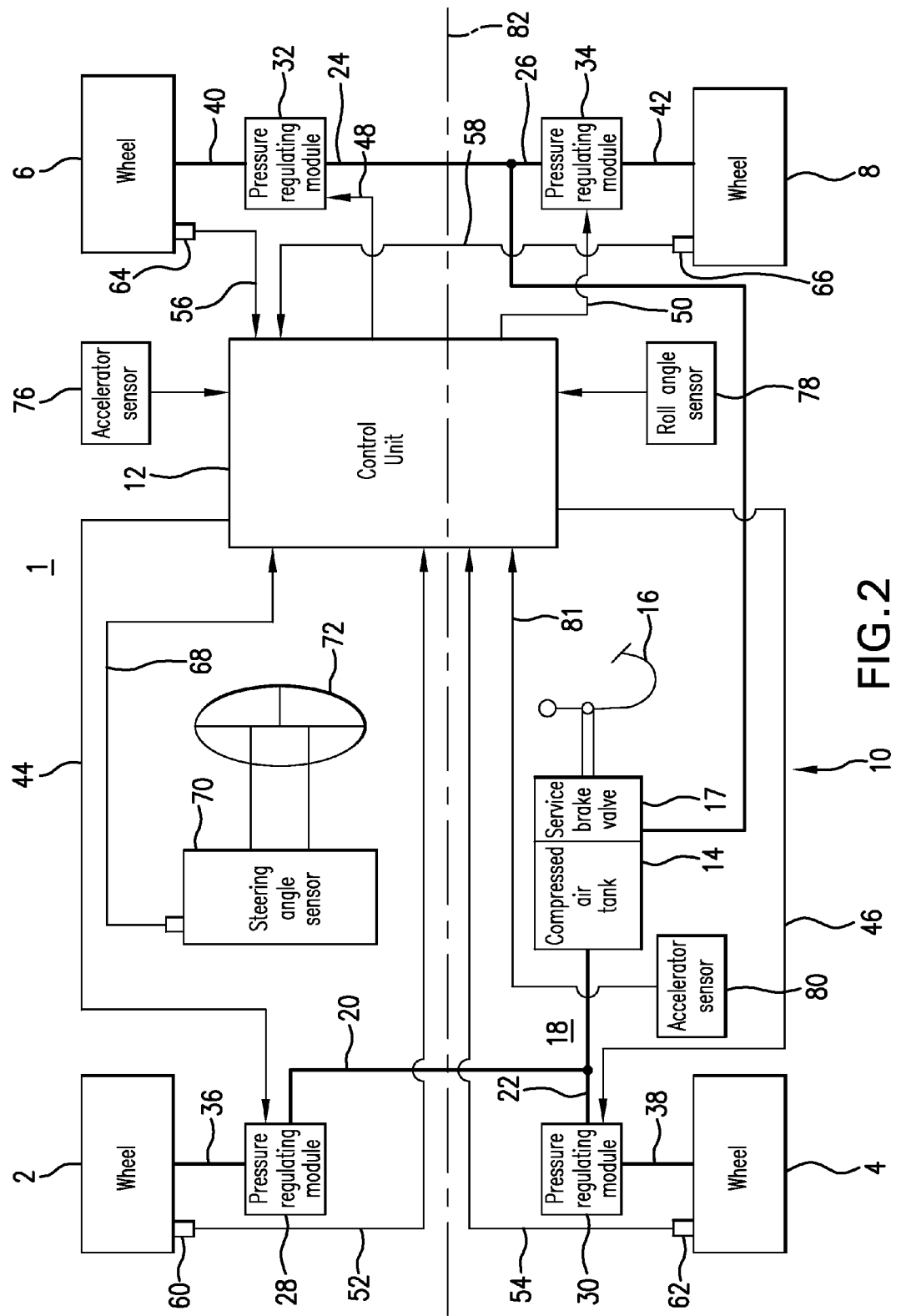
FIG. 2 shows an alternative embodiment of the brake regulating system in FIG. 1.

In the exemplary embodiment according to FIG. 2, a second acceleration sensor 80 for detecting the transverse acceleration of commercial vehicle 10 is provided instead of yaw rate sensor 74, the input of control unit 12 being connected to the second acceleration sensor via signal line 81. Viewed in longitudinal direction 82 of commercial vehicle 10, second acceleration sensor 80 is situated at an offset to first acceleration sensor 76. In this exemplary embodiment, first acceleration sensor 76 together with second acceleration sensor 80 form the sensor system for determining the yaw rate of commercial vehicle 10.

In this system, which permits omitting yaw rate sensor 74, control unit 12 determines yaw rate $\omega_z$ of commercial vehicle 10 based upon the measured values supplied to it $a_{y1}$ (the transverse acceleration measured by first acceleration sensor 76) and $a_{y2}$ (the transverse acceleration measured by second acceleration sensor 80), according to the relation:

$$\omega_z = \int (a_{y1} - a_{y2})/(x_1 - x_2) dt,$$

where $x_1$ and $x_2$ represent the distance between first and second acceleration sensor 76, 80 and the center of gravity of the commercial vehicle, each measured in longitudinal direction 82 of the commercial vehicle.

Control unit 12 of brake regulating system 1 determines transverse acceleration $a_y$ acting in the center of gravity of commercial vehicle 10 according to the relation:

$$a_y = (a_{y1} \cdot x_1 - a_{y2} \cdot x_2)/(x_1 - x_2)$$

The same interim values are thus available for further processing in this embodiment as were in the preceding exemplary embodiment.

Figure 3:
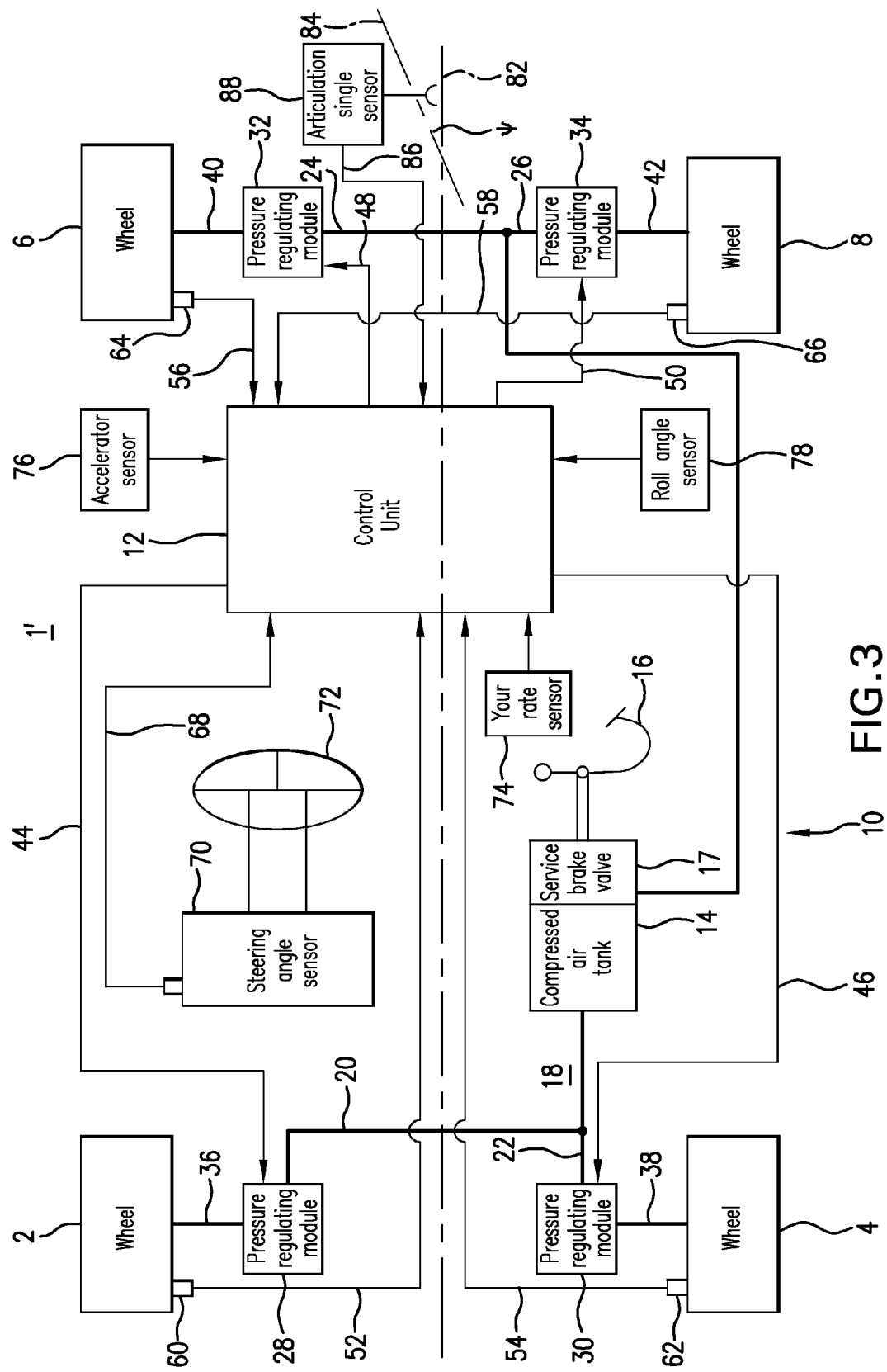
FIG. 3 schematically shows a brake regulating system for stabilizing the motion of a tractor-trailer unit, formed of a commercial vehicle and a trailer coupled thereto.

Brake regulating system 1' according to FIG. 3 is designed for use in an articulated vehicle formed from a commercial vehicle 10, provided a truck tractor, and a semitrailer, illustrated only by its longitudinal axis 84, coupled thereto. Articulation angle Ψ, formed by longitudinal direction 82 of commercial vehicle 10 and longitudinal axis 84 of the trailer, may also be of importance for the stability regulation of such an articulated vehicle or semitrailer truck. In particular, possible jackknifing of the semitrailer with respect to commercial vehicle 10 may result in destabilization. In order to integrate this degree of freedom into the stability regulation, the input of control unit 12 of brake regulating system 1' is connected to a articulation angle sensor 88 for detecting articulation angle Ψ via signal line 86.

Figure 4:
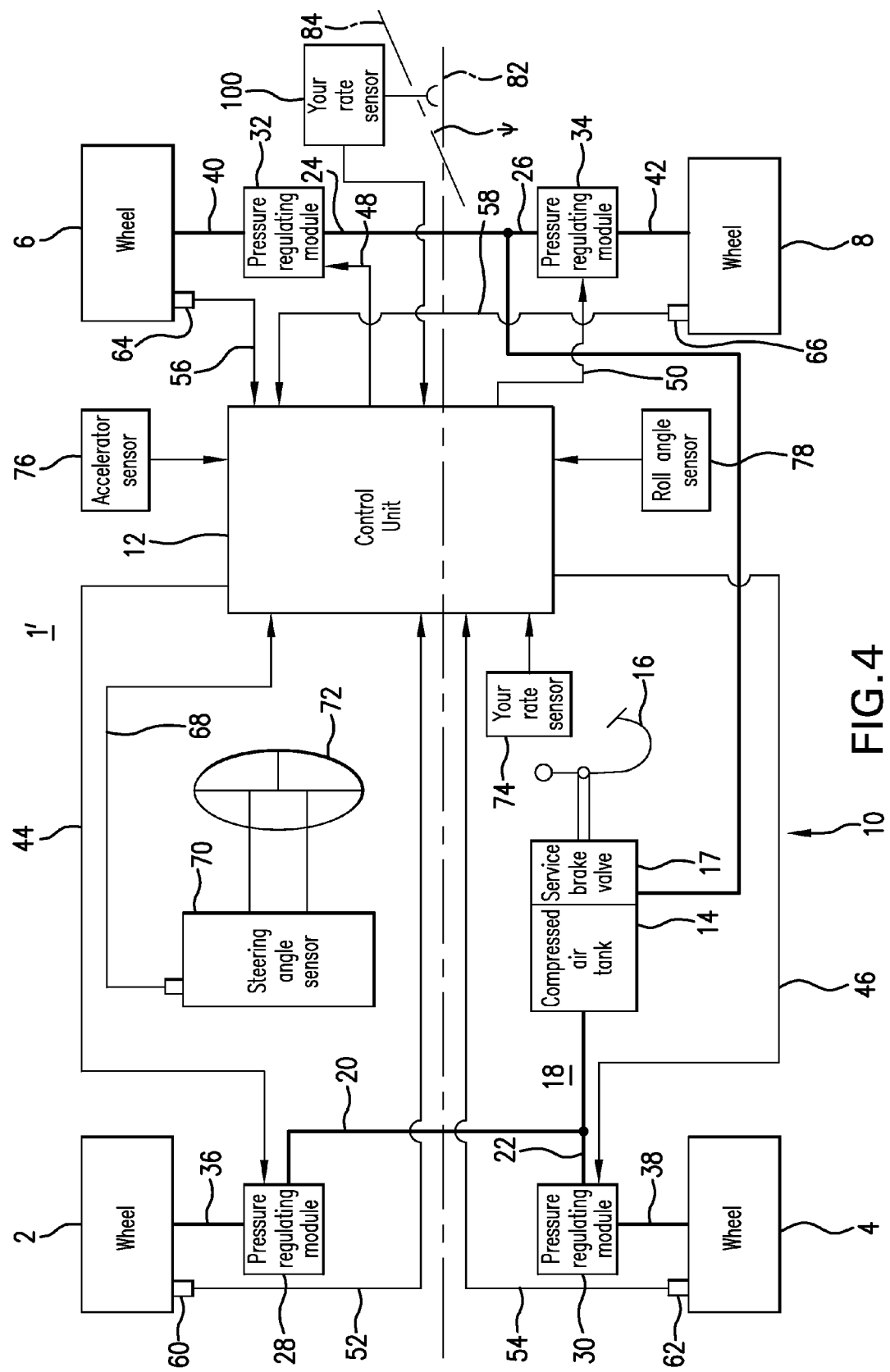
FIG. 4 shows an alternative embodiment of the brake regulating system in FIG. 3.

In the exemplary embodiment according to FIG. 4, the input of control unit 12 of brake regulating system 1' is connected to yaw rate sensor 100, designed according to the Coriolis principle, for determining the yaw rate of the semitrailer connected to commercial vehicle 10. In this arrangement, control unit 12 determines articulation angle Ψ from the values, supplied as input variables, for the yaw rate of the semitrailer $\omega_{za}$ and the yaw rate $\omega_z$ of commercial vehicle 10 according to the relation:

$$\Psi = \int (\omega_z - \omega_{za}) dt$$

Of course, the concept for determining the yaw rate according to the exemplary embodiment in FIG. 2, i.e., the use of a pair of acceleration sensors at an offset in the longitudinal direction instead of the yaw rate sensor, may also be applied to the exemplary embodiments shown in FIGS. 3 and 4.

What is claimed is:

1. A brake regulating system for stabilizing the motion of a commercial vehicle, comprising:
   a control unit configured to output, as a function of a number of input variables, at least one of: i) a predefined manipulated variable for a brake pressure of each wheel of the commercial vehicle, and ii) a predefined manipulated variable for an output variable of a drive engine;
   a steering angle sensor configured to detect a steering angle predetermined by a driver, the steering angle sensor coupled to an input of the control unit and configured to provide the steering angle to the control unit for use as one of the input variables;
   a first acceleration sensor configured to detect a transverse acceleration of the commercial vehicle, the first acceleration sensor coupled to the input of the control unit and configured to provide the transverse acceleration to the control unit for use as one of the input variables;

a sensor system configured to determine a yaw rate of the commercial vehicle, the sensor system coupled to the input of the control unit and configured to provide the yaw rate to the control unit for use as one of the input variables, wherein the sensor system includes a second acceleration sensor configured to detect the transverse acceleration of the commercial vehicle, the second acceleration sensor being situated at an offset to the first acceleration sensor viewed in a longitudinal direction of the commercial vehicle;

a second sensor system configured to determine a yaw rate of at least one trailer connected to the commercial vehicle, the second sensor system coupled to the input of the control unit and configured to provide the yaw rate of the trailer to the control unit for use as one of the input variables; and a buckling articulation angle sensor configured to determine a buckling articulation angle between the longitudinal direction of the commercial vehicle and a longitudinal axis of one of the at least one trailer connected to the commercial vehicle from the yaw rate values provided by the sensor systems, the buckling articulation angle sensor being coupled to an input of the control unit and configured to provide the buckling articulation angle to the control unit for use as one of the input variables.

2. The brake regulating system as recited in claim 1, wherein the sensor system includes a yaw rate sensor.

3. The brake regulating system as recited in claim 2, further comprising:

a roll angle sensor configured to detect a roll angle of the commercial vehicle, the roll angle sensor coupled to the input of the control unit and configured to provide the roll angle to the control unit for use as one of the input variables.

4. The brake regulating system as recited in claim 3, further comprising:

a roll velocity sensor configured to detect an angular velocity between a vehicle body of the commercial vehicle and a vehicle axis of the commercial vehicle, the roll velocity coupled to the input of the control unit and configured to provide the angular velocity to the control unit for use as one of the input variables.

5. The brake regulating system as recited in claim 2, further comprising:

a roll velocity sensor configured to detect an angular velocity between a vehicle body of the commercial vehicle and a vehicle axis of the commercial vehicle, the roll velocity coupled to the input of the control unit and configured to provide the angular velocity to the control unit for use as one of the input variables.

6. The brake regulating system as recited in claim 2, wherein the buckling articulation angle sensor determines the buckling articulation angle $\Psi$ from the yaw rate values $\omega_z$ and $\omega_{za}$ provided by the sensor systems according to the relation: $\Psi = \int (\omega_z - \omega_{za}) dt$.

7. The brake regulating system as recited in claim 6, wherein:

more than one trailer is connected to the commercial vehicle, each trailer is equipped with a sensor system for determining its yaw rate, and the articulation angle between each two consecutive vehicles or trailers is determined from the yaw rate values provided by the sensor systems.

8. The brake regulating system as recited in claim 2, wherein:

more than one trailer is connected to the commercial vehicle, each trailer is equipped with a sensor system for determining its yaw rate, and the articulation angle between each two consecutive vehicles or trailers is determined from the yaw rate values provided by the sensor systems.

9. The brake regulating system as recited in claim 1, further comprising:

a roll angle sensor configured to detect a roll angle of the commercial vehicle, the roll angle sensor coupled to the input of the control unit and configured to provide the roll angle to the control unit for use as one of the input variables.

10. The brake regulating system as recited in claim 9, further comprising:

a roll velocity sensor configured to detect an angular velocity between a vehicle body of the commercial vehicle and a vehicle axis of the commercial vehicle, the roll velocity coupled to the input of the control unit and configured to provide the angular velocity to the control unit for use as one of the input variables.

11. The brake regulating system as recited in claim 1, further comprising:

a roll velocity sensor configured to detect an angular velocity between a vehicle body of the commercial vehicle and a vehicle axis of the commercial vehicle, the roll velocity coupled to the input of the control unit and configured to provide the angular velocity to the control unit for use as one of the input variables.

12. The brake regulating system as recited in claim 1, wherein the sensor system determines the yaw rate without a yaw rate sensor by using the first and second acceleration sensors to determine the yaw rate.

13. The brake regulating system as recited in claim 1, wherein the buckling articulation angle sensor determines the buckling articulation angle $\Psi$ from the yaw rate values $\omega_z$ and $\omega_{za}$ provided by the sensor systems according to the relation: $\Psi = \int (\omega_z - \omega_{za}) dt$.

14. The brake regulating system as recited in claim 13, wherein:

more than one trailer is connected to the commercial vehicle, each trailer is equipped with a sensor system for determining its yaw rate, and the articulation angle between each two consecutive vehicles or trailers is determined from the yaw rate values provided by the sensor systems.

15. The brake regulating system as recited in claim 1, wherein:

more than one trailer is connected to the commercial vehicle, each trailer is equipped with a sensor system for determining its yaw rate, and the articulation angle between each two consecutive vehicles or trailers is determined from the yaw rate values provided by the sensor systems.

* * * * *